United States Patent [19]
Shelton et al.

[11] Patent Number: 5,777,575
[45] Date of Patent: Jul. 7, 1998

[54] RADAR SWITCHING SYSTEM

[75] Inventors: Maurice E. Shelton; Thomas E. Mitchell, both of Chanute, Kans.

[73] Assignee: Kustom Signals, Inc., Lenexa, Kans.

[21] Appl. No.: 731,057

[22] Filed: Oct. 9, 1996

[51] Int. Cl.⁶ .................................................. G01S 13/58
[52] U.S. Cl. .................................................. 342/104
[58] Field of Search .................................. 342/104, 175

[56] References Cited

PUBLICATIONS

H.A.W.K. Traffic Safety Radar; Kustom Signals, Inc.; Lenexa, Kansas; pp. 1–4; (342/104), 1995.

*Primary Examiner*—Daniel T. Pihulic
*Attorney, Agent, or Firm*—Chase & Yakimo

[57] ABSTRACT

An improved switching system for controlling a radar control unit includes a radar hold switch and lock release switch on a remote control. Depression of the hold switch places the radar in a hold or standby mode. Upon depression and holding of the lock switch tracking of the target vehicle occurs. Upon release of the lock switch the displayed vehicle speed will be locked on the lock window of the radar with the radar unit being placed in a standby mode. A subsequent depression and release of the lock/release switch clears the locked target speed and maintains the unit in a standby mode. Underlying logic utilized by the signal processor analyzes signals corresponding to the positions of the hold and lock switches so as to direct the radar into the appropriate mode.

12 Claims, 5 Drawing Sheets

RADAR SWITCHING SYSTEM

BACKGROUND OF THE INVENTION

This invention relates to improvements in traffic radar devices and, more particularly, to a switching apparatus and method for monitoring the switch status which allows a user to efficiently cycle the radar between standby and transmitting modes as well as an intermittent mode for locking the calculated speed of a target vehicle on a lock window of the radar unit.

During radar use it is customary for the user, i.e. a police officer, to place the radar in a "hold" or "standby" position so that no microwave frequency signals are transmitted which could alert vehicles equipped with a radar detector. Upon spotting a suspect vehicle the officer must depress a first switch to release the radar transmitter from the hold/standby mode for transmission of the radar signals onto the suspect vehicle. The return signals contains Doppler information that is utilized by internal program logic of a signal processor to calculate the target vehicle speed. If the target vehicle speed, as displayed in the target window, exceeds the speed limit a separate lock switch on the radar is pressed so as to preserve this target speed display in the lock window. Once this target vehicle speed display is locked, the hold switch is again pressed so as to cease microwave transmission and return the radar to a hold/standby mode.

The above procedure requires a number of discrete manipulations by the police officer of separate first and second switches. Such procedure may lead to awkward and inefficient use of the radar which raises the possibility of user error. Thus, it is desirable to provide a switching mechanism for a traffic radar which allows the radar user to more efficiently cycle the radar between hold and transmitting modes as well as to lock and then clear the display of the vehicle speed in the lock window.

In response thereto we have invented a radar switching mechanism with underlying program control logic which allows a radar user to quickly cycle the radar between the hold and transmission modes while enabling the user to selectably lock or clear the displayed target vehicle speed in the lock window. These user-controlled functions are accomplished by utilization of a remote lock/release switch, after initial depression of a hold switch, the lock/release switch enabling the user to cycle the radar between hold/standby and transmission modes, track the target vehicle, lock the vehicle target speed in the lock display window of the radar, return the radar to a hold mode and then clear the speed display from the lock window. The underlying control logic monitors depression of the hold and lock/release switches so as to cycle the radar among these modes.

It is therefore an object of this invention to provide an improved switching mechanism for use in connection with a radar device.

Another object of this invention is to provide underlying program logic in connection with the switching mechanism so as to cycle the radar among its desired functions.

A further object of this invention is to provide a switching system including the switching mechanism with program logic, as aforesaid, the system presenting a single switch operable by the radar user for regulating the transmission of the radar's microwave energy as well as the locking and clearing of a displayed vehicle speed.

A further object of this invention is to provide a radar switching system, as aforesaid, which diminishes the possibility of user error.

Another object of this invention is to provide a switching system, as aforesaid, which continuously monitors the status of the hold and lock/release switches.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
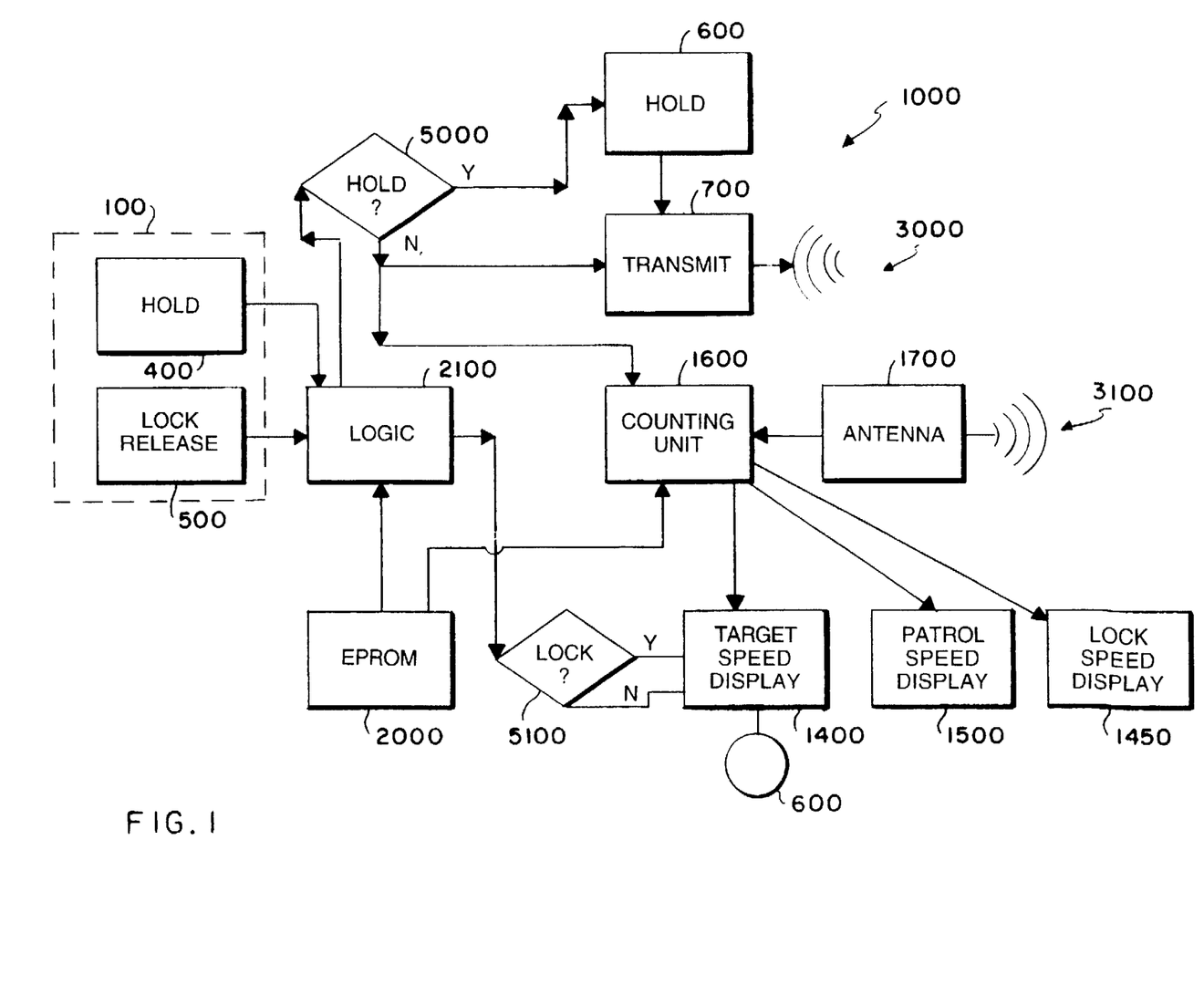
FIG. 1 is a basic block diagram showing the switch mechanism as utilized in connection with a conventional radar device.

Turning more particularly to the drawings, FIG. 1 is a block diagram illustrating the basic elements of a radar detector system utilizing our improved switching mechanism. As shown, the radar system 1000 transmits a radio frequency signal onto a suspect vehicle. A portion of this transmitted signal 3000 strikes the roadway surface and terrain and reflects back 3100 to an antenna 1700. This signal is a "low" Doppler signal and is processed by a signal processor/counting unit 1600 and displayed on a window 1500 as the patrol vehicle speed. A portion of the transmitted signal strikes the oncoming target vehicle and returns at a higher frequency due to vehicle convergence. The counting unit 1600 measures the combined speed of the patrol and target vehicles and computes the difference therebetween. The speed of the approaching vehicle will then be displayed on the target window 1400 of the radar unit 1000.

As known, a signal processor utilizes a dedicated intensive logic control system which resides on an EPROM 2000. This system includes signal responsive decision logic and stored data which analyzes the information embedded in the return signals so as to calculate the speed of the patrol and/or target vehicles and ultimately the target vehicle speed.

Figure 2:
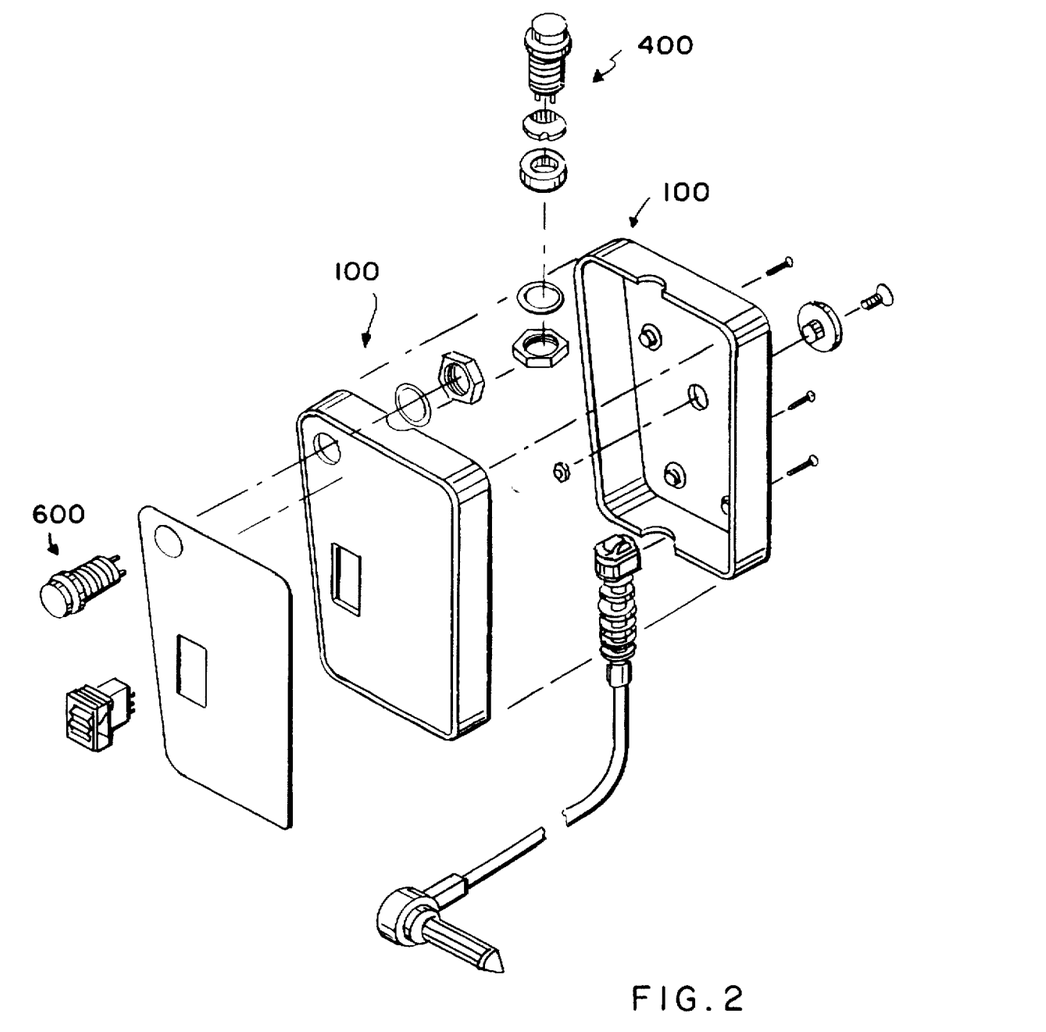
FIG. 2 is a perspective view showing a remote control of the radar device utilized in connection with the invention.
Figure 3:
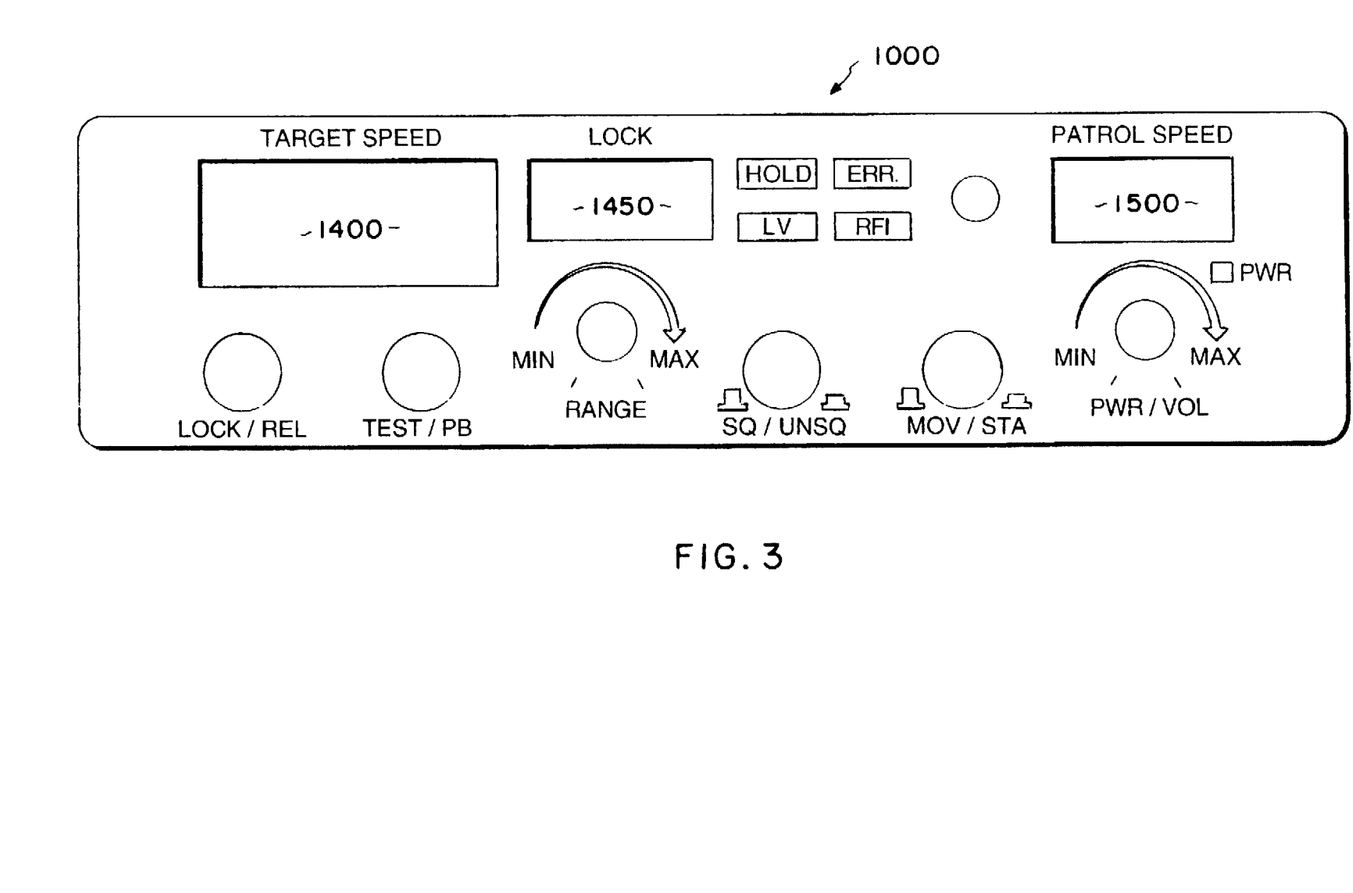
FIG. 3 is a view showing the front panel of a radar device utilized in connection with the invention.
Figure 4:
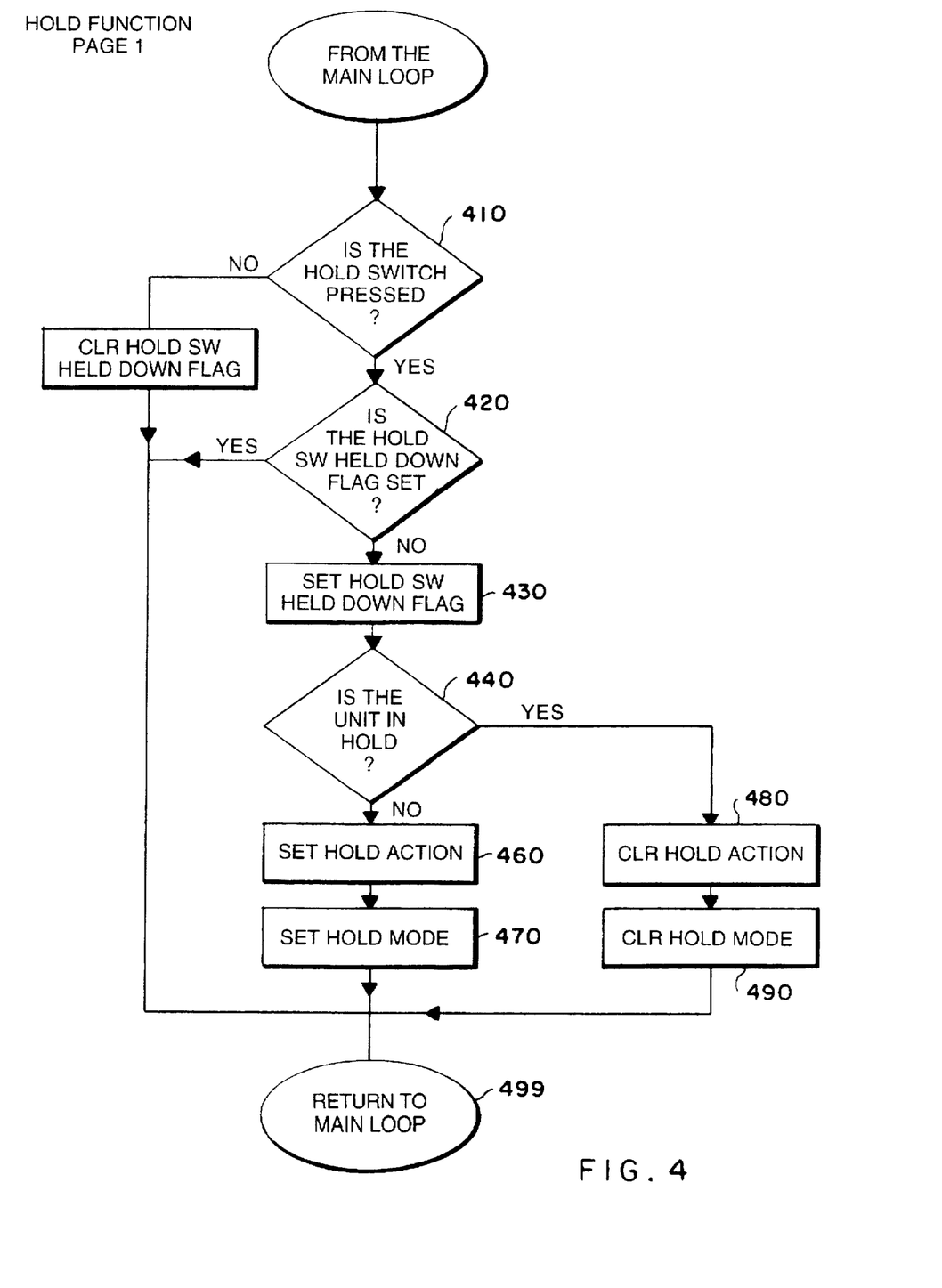
FIG. 4 is a flow diagram of the logic utilized in monitoring the hold switch of the radar device.
Figure 5:
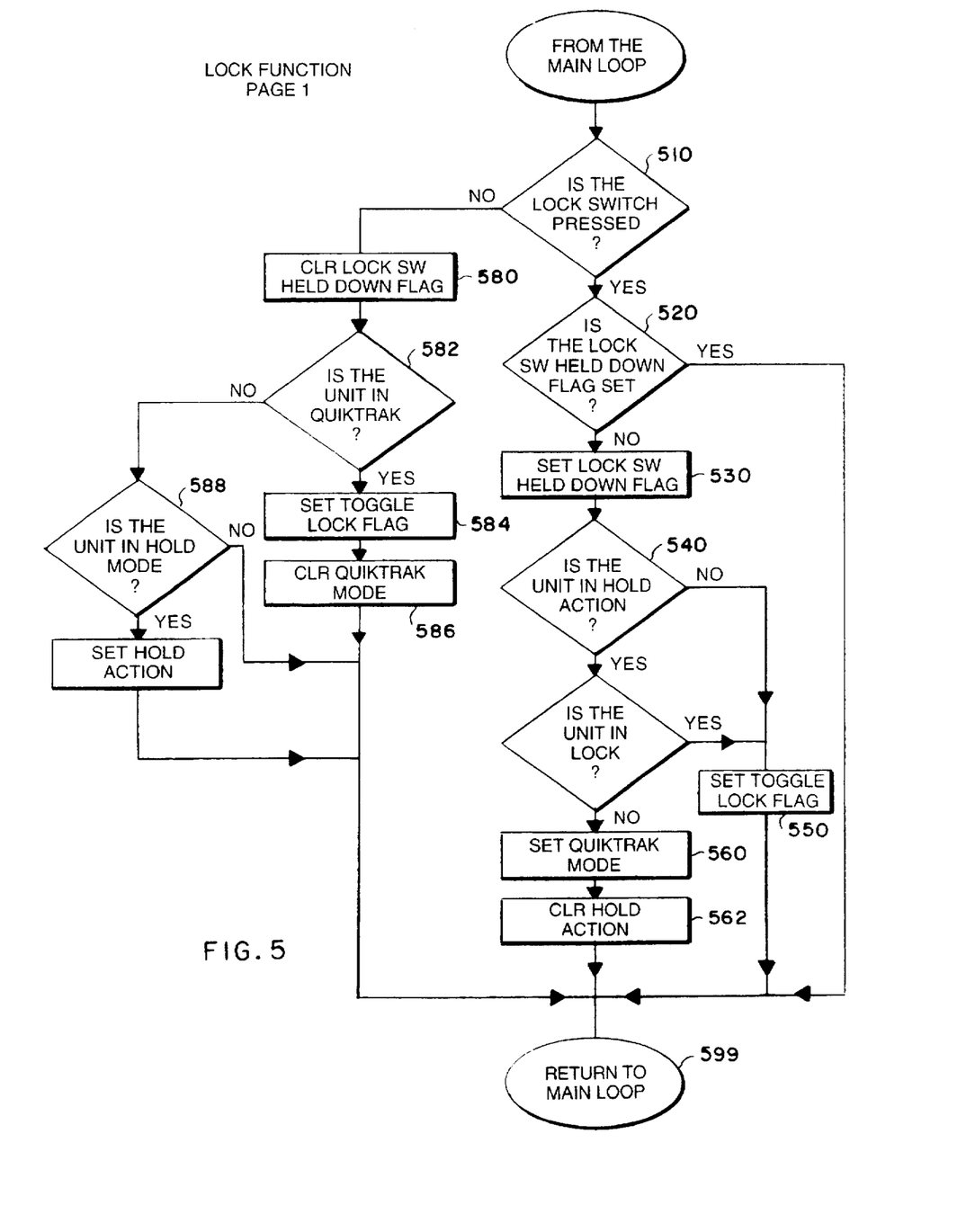
FIG. 5 is a flow chart showing the logic utilized in monitoring the lock/release switch of the radar device.

Incorporated into this program logic 2100 is a logic flow as shown in FIGS. 4–5 which monitors signals corresponding to the current status of the hold 400 and lock/release momentary switches 500 of the remote control 100 (FIG. 2). This logic compares the current status of these switches to their previous status. Upon a change in status of the hold 400 and/or lock/release 500 switches certain radar modes/functions will occur. These functions include placement of the radar in standby 600 or transmit 700 modes as well as to lock or release the target vehicle speed display from window 1450.

The switching mechanism includes the remote hold 400 and lock/release 500 switches. Depression and release of the hold switch 400 places the unit in either a standby or transmit mode. Once in the hold mode, a depression and holding of the lock/release switch 500 will change the unit from a standby mode to a transmit mode and initiate tracking of the target vehicle, in the target display window 1400. Upon release of the lock switch 500 the vehicle target speed will be locked in the radar window 1450, the unit then returning to a hold/standby mode. Upon subsequent depression and release of the lock switch 500 the vehicle's locked speed display 1450 will be cleared from the window 1450 with the radar unit remaining in a standby mode.

Accordingly, the utilization of the lock/release switch 500, allows the officer to control modes of the radar 1000 by utilizing only one switch.

The logic flow to monitor the status of switches 400, 500 is found on the EPROM 2000 and is hereinbelow described. As shown in FIGS. 1, 4 and 5, the positions of the momentary hold switch 400 and lock/release switch 500, as presented in signal form, are analyzed by the FIG. 4 and FIG. 5 program logic. It is understood that appropriate signal information is continuously delivered for analysis to the FIG. 4 or 5 program logic corresponding to the up or down positions of these switches. In such logic, the current position of each switch 400, 500 is determined as well as the previous position of each switch 400, 500 so as to ascertain if a change in switch position has occurred. Upon a change in switch 400, 500 position, appropriate steps are taken by the logic to analyze the change and subsequently initiate an appropriate radar function. If no change in switch position has occurred, the radar function being performed continues.

A check is first made at 410 as to see whether the hold switch 400 is in a pressed/down position. If the hold switch 400 is pressed the user desires to switch the radar 1000 from either a standby or transmit mode to the opposed mode.

Accordingly, if switch 400 is pressed, a check is made at 420 of a hold switch down flag. If the hold switch down flag is in a set position this indicates that the hold switch 400 had been pressed in the previous analysis. Thus, no change of the hold switch position has occurred. As no change has occurred, there is no need to change the radar mode and the hold switch routine is exited at 499.

If the check of the hold switch at 410 indicates that the hold switch is not pressed, there is no desire to change the mode of the radar unit via the hold switch 400. Thus, the hold switch down flag is cleared and the FIG. 4 logic routine is exited at 499. A clear hold switch down flag indicates that the hold switch was not previously pressed in the next analysis.

If the hold switch 400 has been pressed and the hold switch down flag has not been set, a change in switch 400 position has occurred. Thus, the radar is to be changed from one mode to the other. The hold switch down flag is set at 430 to indicate a hold switch 400 depression in the next analysis. A check is then made at 440 to ascertain whether the unit 1000 is in a hold mode or a standby mode. If the unit 1000 is not in a hold mode, hold action and hold mode flags are set at 460, 470 and the routine is exited. If the unit is in a hold mode the hold action flag and hold mode flags are cleared at 480, 490. The hold action flag is used by a separate signal processor routine at 5000 to turn on or shut down radar wave transmission according to the flag status. The hold mode flag is used in a lock function routine at 5100, as to be subsequently described, to ascertain whether to return the radar unit to a hold mode when tracking of a target vehicle has ended. Accordingly, if the hold switch 400 is currently pressed and was not previously pressed, this program logic will set appropriate flags to be used by an embedded routine to switch the mode of the radar unit.

Also included in the program logic is the FIG. 5 routine which monitors the positions of the lock/release switch 500 and whether such a switch position is a change from the previous lock/release switch 500 position.

The position of the lock/release switch 500 is checked at 510. If pressed, a check is made at 520 to see if a lock switch held down flag is already set. If switch 500 is depressed and the lock switch hold down flag is set, no change in the lock switch 500 down position has occurred. Thus, there is no need to change the radar mode and the routine is exited at 599.

If the lock switch held down flag was not been set it is then set at 530 so as to indicate a down position of the lock switch 500 in the next analysis. The status of the radar unit is then checked by checking the hold action flag at 540 to ascertain whether the unit is in a hold/standby mode. If the unit is not in a hold mode, transmission of radar onto a target vehicle is occurring. A depression of the lock/release switch during radar wave transmission indicates that the user desires to lock in the target speed to the lock speed display 1450. Accordingly, a toggle lock flag is set at 550 which is used by a signal processor routine 5100 to lock in the current target vehicle speed in window 1400 to the lock speed display 1450.

If the radar unit is in a hold mode, a check is made to ascertain whether the unit is in a locked mode. If the lock switch 500 has been depressed and the unit is already in a locked position, this indicates that the locked speed display 1450 is to be cleared from the unit. Accordingly, the toggle lock flag is set at 550 which is sent to a routine 5100 which will unlock the displayed lock speed and return the unit to hold.

If the lock switch 500 has been pressed, the unit is in hold and not locked, tracking of the target vehicle speed is desired at 550. The tracking mode is initiated at 560 and the hold action flag is cleared at 562. Thus, the unit will be taken out of the hold mode for vehicle tracking to occur.

Alternatively, if the lock switch 500 has not been pressed, the lock switch held down flag is cleared at 530. The unit 1000 is then checked to ascertain whether it is in a tracking mode at 582. If the lock switch 500 is up and the unit is in a tracking mode, the user desires to lock in a target vehicle speed. Thus, a toggle lock flag is set at 584 and the tracking mode is cleared at 586. Accordingly, the target speed will be locked in window 1450 with the radar unit being returned to a hold/standby position.

If the lock switch 500 is up and the unit is not in a tracking mode, a check is then made to ascertain if the radar unit is in a hold mode at 588. If the unit is not in a hold mode, the routine is exited at 599. If the unit is in a hold mode, a hold action flag is set and exited.

Accordingly, the program logic continuously analyzes the positions of the momentary hold 400 and lock/release 500 switches so as to control the hold, transmit and tracking mode of the radar as well as a locking in clearing from the window 1450 the locked vehicle speed. By utilization of such program logic the user can quickly and efficiently control the radar standby and transmit modes, track target vehicles and lock and subsequently clear the calculated target vehicles, all functions being controlled by the lock/release switch 500 with the hold switch 400 in a down position.

It is understood that the above program logic is but one form of logic utilized and that other logic may be devised having been presented with the above disclosure.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. In a Doppler traffic radar having transmission, standby and vehicle tracking modes, a counting unit for converting transmitted waves reflected from a target vehicle into a target speed and a screen for displaying a target vehicle speed and target locked speed thereon, an improved switching mechanism comprising:

first switch means in circuitry of the radar unit for placing the radar unit in either a standby or a microwave transmission mode;

a second switch means in circuitry of the radar unit for changing a radar unit from a standby mode to a transmission mode to direct radar waves onto a target vehicle, the tracking mode calculating a speed of a target vehicle from transmitted waves being reflected off said target vehicle, said second switch means further including means for locking the vehicle speed on the screen display and returning said radar unit to a standby mode;

said second switch means further including means for clearing said vehicle speed from said display while maintaining said radar unit in said standby mode.

2. The system as claimed in claim 1 further comprising logic means for monitoring a signal delivered by a depression of said first and second switch means, said logic means providing electrical characteristics to said radar circuitry for controlling said standby, transmission, tracking and locking of said radar.

3. The system as claimed in claim 2 wherein said logic means places said radar in said standby mode upon receiving a signal that said first switch means is in a first depressed position.

4. The system as claimed in claim 3 wherein said logic means places said radar in a tracking mode upon receiving a signal that said second switch means is in a first depressed position.

5. The system as claimed in claim 4 wherein said logic means locks said target vehicle speed on said screen display and places said radar unit in said standby mode upon said logic means receiving a signal that said second switch means is in an up position.

6. The system as claimed in claim 5 wherein said logic means clears said locked target vehicle speed from said screen display upon a second depression and release of said second switch means.

7. In a Doppler traffic radar:

a transmitter having standby and transmission modes, said transmission mode delivering a radar wave for direction onto a target vehicle;

an antenna unit having an output for delivering a Doppler return signal derived from reflection of said radar wave from a target vehicle;

means for processing said Doppler return signal in a manner to calculate the speed of the target vehicle and displaying said speed on a screen of the traffic radar;

a first switch means for placing said transmitter in a hold mode;

a second switch means for placing said transmitter in said transmission mode and energizing said processing unit upon a depression thereof, said switch means subsequently locking said vehicle speed displayed on said screen and returning said transmitter to said standby mode upon return of said switch means to an up position, a subsequent depression of said second switch means clearing said displayed locked vehicle speed from said screen.

8. The system as claimed in claim 7 further comprising logic means for monitoring a signal delivered by a depression of said first and second switch means, said logic means providing characteristics to radar circuitry for placing said radar in said standby or transmission modes, energizing said processing means and locking or clearing said screen displayed vehicle speed.

9. The system as claimed in claim 8 wherein said logic means places said radar in said standby mode upon receiving a signal that said first switch means is in a first depressed position.

10. The system as claimed in claim 9 wherein said logic means energizes said processing unit upon receiving a signal that said second switch means is in a first depressed position.

11. The system as claimed in claim 10 wherein said logic means locks said target vehicle speed on said screen display and places said radar unit in a hold mode upon said logic means receiving a signal that said second switch means is in an up position.

12. The system as claimed in claim 11 wherein said logic means clears said target vehicle speed from said screen display upon a second depression and release of said second switch means.

* * * * *

UNITED STATES PATENT AND TRADEMARK OFFICE
CERTIFICATE OF CORRECTION

PATENT NO. : 5,777,575
DATED : July 7, 1998
INVENTOR(S) : Maurice E. Shelton and Thomas E. Mitchell It is certified that error appears in the above-identified patent and that said Letters Patent is hereby corrected as shown below:

Column 5, line 4, after "having" insert --a--.

Column 5, line 4, delete ", standby".

Column 5, line 5, delete "and vehicle tracking modes," and substitute --mode for vehicle tracking and standby mode,--.

Column 5, line 14, delete "a radar" and substitute --the radar--.

Column 5, line 17, delete ", the tracking mode" and substitute --for tracking and--.

Column 6, line 11, delete "displaying" and substitute --display--.

Column 6, line 12, delete "a hold" and substitute --said standby--.

Column 6, line 15, delete "unit" and substitute --means--.

Column 6, line 16, after "said" insert --second--.

Column 6, line 19, after "said" insert --second--.

Column 6, line 20, after "depression" insert --and release--.

Column 6, line 36, delete "unit" and substitute --means--.

UNITED STATES PATENT AND TRADEMARK OFFICE
CERTIFICATE OF CORRECTION

PATENT NO. : 5,777,575
DATED : July 7, 1998
INVENTOR(S) : Maurice E. Shelton and Thomas E. Mitchell It is certified that error appears in the above-identified patent and that said Letters Patent is hereby corrected as shown below:

Column 6, line 40, delete "hold" and substitute --standby--.

Signed and Sealed this

Twenty-second Day of December, 1998

Attest:

BRUCE LEHMAN

*Attesting Officer*          *Commissioner of Patents and Trademarks*